United States Patent Office 3,293,220
Patented Dec. 20, 1966

3,293,220
PROCESS FOR HEAT STABILIZATION OF POLYOXYMETHYLENE
Muneyoshi Minami, Yoshizo Tsuda, Kiichiro Sando, Junzo Kashiro, and Kiyoshi Tamura, all of Shiga-ken, Japan, assignors to Toyo Rayon Kabushiki Kaisha, Tokyo, Japan, a corporation of Japan
No Drawing. Filed Oct. 8, 1963, Ser. No. 314,599
Claims priority, application Japan, Oct. 11, 1962, 37/43,795
4 Claims. (Cl. 260—67)

The present invention relates to a new process for the stabilization of polyoxymethylene.

More particularly, this invention relates to a process for heat-stabilization of macro-molecular polyoxymethylene by treating with aldehyde discarboxylate.

Macro-molecular polyoxymethylene itself is superior in chemical as well as thermal stability to low molecular polyoxymethylene, however, its weak point is that the stability is lost as time passes by.

As a matter of fact, in order to meet the commercial demand, in carrying out heat-treatment thereof in molding, some additional treatment must be done.

This weak point mentioned above is mainly attributable to the hydroxylic radical existing as a terminal group, and attempts have long been advocated so far to enhance the heat-stability by esterificating or etherificating this unstable terminal group, for example, as in "Hochmoleculare Org. Verbindungen, Springer-Verlag (1932) by H. Staudinger.

As more concrete examples of the treatment of terminal groups, the following are well known; the esterification by carboxylic acid anhydride (published specification No. 6099/1958 British Patent 770,717), and by Ketene groups (published specification No. 3,440/1961), the etherification by acetal (published specification 6233/1960, British Patent 868,365), ketal, ortho carboxylic acid ester, ortho carbonic acid ester (published specification 3492/1961, Belgian Patent 584,924; British Patent 877,-256) α-chloroalkylether (British Patent 848,660, German Patent 1,091,750) diazomethane (published specification 11,244/1962; British Patent 894,439), and the urethanification by Isocyanate (published specification 1761/1961; British Patent 875,560, U.S. Patent 2,296,249). The term "Published Specification" as used hereinabove designates publications appearing in the Japanese Official Patent Gazette.

As mentioned above, there have hitherto been processes for stabilization by acylating the terminal groups of macro-molecular polyoxymethylene by employing carboxylic acid anhydride or ketone groups.

However, this invention is related to the process where stabilization is obtained by carrying out substitutional acylating reaction between the terminal groups of macro-molecular polyoxymethylene and aldehyde-dicarboxylate prepared beforehand. Thus according to the process for stabilization by the substitutional acylating reaction by employing aldehyde-dicarboxylate of this invention, the operation of the reaction is much easier than the hitherto known processes, and it is also easy to inhibit by-reactions.

Therefore, the object of this invention is to provide a process for heat-stabilization of polyoxymethylene such as easy to operate the reaction and remarkably controllable of by-reactions by means of substitutional acylating reaction with aldehyde dicarboxylate against the hithertofor known stabilizing process of polyoxymethylene by acylation. According to the process of this invention, it is possible to stabilize polyoxymethylene by substitutional acylation of polyoxymethylene with aldehyde dicarboxylate in the presence of an acylating catalyst.

The polyoxymethylene of this invention is the homopolymer having repeated unit of oxymethylene, or the copolymer having repeated combination of oxymethylene and oxyalkylene with more than two carbon atoms.

For example formaldehyde homopolymer, trioxane homopolymer, copolymer of trioxane along with dioxolane, copolymer of trioxane along with dioxepane, and copolymer of trioxane along with styrene.

The aldehyde dicarboxylate employed in this invention is represented by the following Formula 1.

(1)

(wherein R, R', R" are the compounds represented by the organic residual radicals congenerous or heterogenous.)

In the foregoing Formula 1 R, R', R" are congenerous or heterogenous radicals selected from among the groups composed of alkyl, cycloalkyl, aryl, heterocyclic radical, and their substituted radical, of which the substituent is such group as follows;

(a) alkoxy, aryloxy, acyloxy, alkylthio, arylthio, dialkylamino, diarylamino, and alkylarylamino, alkylacylamino, arylacylamino, halogen, acyl, cyano, nitro, etc.
(b) alkyl, cycloalkyl, aryl, hetero cyclic radicals.
(c) the radical of the groups in (b) which is substituted by the groups in (a).

Namely, the following are the examples:

(a) alkoxyalkyl, arylthioalkyl, acyloxyaryl, dialkylaminoaryl, halocyclohexyl, nitrofuryl, etc.
(b) benzyl, tolyl, xylyl, alkyl-substituted cyclohexyl, alkyl-substituted furyl, etc.,
(c) acyloxyalkylaryl, dialkylaminoaralkyl, etc.

The examples of such aldehyde dicarboxylates, at first being limited to diacetates, are such aliphatic aldehyde diacetates as ethylidenediacetate, propylidene diacetate, 2 - alkylpropylidenediacetate, octadodecylidenediacetate, furylethylidenediacetate, β - alkylthioethylidenediacetate; such aromatic aldehydediacetate, as benzylidenediacetate, nitrobenzylidenediacetate, chlorobenzylidenediacetate, bromobenzylidenediacetate, alkylbenzylidenediacetate, alkoxybenzylidenediacetate, dialkylbenzylidenediacetate, phenylethylidenediacetate, phenyl propylidenediacetate, and such alicyclic aldehydediacetates as cyclohexyl methylenediacetate; and such heterocyclic aldehydediacetates as furfurylidene diacetate, nitrofurfurylidenediacetate, chlorofurfurylidene diacetate, bromofurfurylidene diacetate, etc.

We have discussed so far only about the examples of diacetates, but other dicarboxylate of which acid residual radicals are propionic acid-, butyric acid-, palmitic acid-, stearic acid-, benzoic acid-, furoic acid-residual, etc., and furthermore substituted fatty acid residual radicals, substituted benzoic acid residual radicals, and substituted furoic acid residual radicals, whereby the substituents are such as a kind or more of alkyl, aryl, alkoxy, alkylthio, aryloxy, or halogen etc. can be added to the foregoing examples.

And such composed of acid residual radicals as dipropionate, dibutylate, dipalmitate, distearate, dibenzoate, ditoluate, dimethoxybenzoate, dichlorobenzoate, difuroate and 5-methylfuroate etc.

Of course, dicarboxylate of which the acid residuals are different such as acetic acid and butyric acid, acetic acid and benzoic acid etc. can be also useful.

The suitable aldehyde dicarboxylates because they are easy to obtain and effective, are diacetate, dipropionate, dibutylate, dipalmitate, distearate, dibenzoate, difuroate of benzylidene-, halobenzylidene-, alkylbenzylidene-, alkoxybenzylidene-, acyloxybenzylidene-, dialkylaminobenzylidene-, aryl substituted alkylidene-, furfurylidene-, halogen substituted furfurylidene- residual.

Among them, benzylidene-diacetate, dibutylate, dibenzoate, furfurylidenediacetate, dibutylate, dibenzoate are desirable. Such aldehyde dicarboxylate can be easily obtained as the corresponding aldehyde dicarboxylate with the quantitative yield by having aldehyde in reaction with carboxylic acid anhydride in the presence of such acidic catalysts as $H_2SO_4$ toluolsulfonic acid, and cationic resins, and this reaction can be smoothly carried out at room temperature or at elevated temperature.

As acylating catalysts, hitherto known acylating catalysts can be employed in acylation reaction insofar as they do not decompose polyoxymethylene to a remarkable extent, however, according to the process of this invention, the basic salts of alkaline metals, the basic salts of alkaline earth metals, organic bases, the salts made from organic bases and Lewis acid and Lewis acid complex are preferable.

As such acylating catalysts, the basic salts of alkaline metals, such as sodium acetate, potassium acetate, and the basic salts of alkaline earth metals such as calcium acetate, and organic bases such as dimethylaniline, diethylaniline, pyridine, picoline lutidine, quinoline, triethylamine, tripropylamine, tributylamine, tetra alkyl ethylenediamine, alkylmorpholine, alkylpiperidine, alkylpiperazine, etc., can be employed.

In addition, the salts of hydrofluoric acid, hydrochloric acid, hydrobromic acid, hydroiodic acid, and their quartery ammonium salts such as halide namely iodide, fluoride, chloride, or bromide with the methyl-, ethyl-, propyl-, butyl-, octyl-, cetyl-, benzyl-, or phenethyl-radical, can be employed. As to organic bases, they are especially preferable acylating catalysts, and the greater the basicity is, the better becomes the catalysing efficiency.

The amount of acylating catalyst employed against polyoxymethylene can be varied in wide range, but on average, in case of organic bases, 1 to 50% by weight, or more preferably 3 to 30% by weight, and in case of other salts and complex compounds, 0.0001 to 1% by weight or more preferably 0.001 to 0.1% by weight can be applied thereto.

The acyl-exchange reaction is carried out usually at room temperature up to 220° C., or more preferably between 130 to 190° C.

Here is no special restriction on the employed amount of aldehyde dicarboxylate against polyoxymethylene, however, 2 to 10 times by weight can be preferably employed.

At the same time, the reaction can be carried out without employing the solvent, however, even employing the solvent, the reaction can be carried out likewise. As the example of such a solvent as mentioned above, γ-butyrolactone, acetphenone, dimethyl formamide.

In case the solvent is employed the amount employed is sufficiently 10 to 100% by weight against aldehyde dicarboxylate.

In the acylating reaction by means of aldehydedicarboxylate as proposed by this invention, it is possible to control the decomposition of polyoxymethylene in the process of the reaction, and to obtain the aimed product in a more preferable state by the addition of a kind or more of such agents as carbodiimide, isocyanate, isothiocyanate, cyanamide, epoxy compounds, vinylester vinyl ether, or thiovinylether.

Such cracking-controllers can be applied by the amount of 0.2 to 20% by weight against polyoxymethylene.

The employment of hitherto known terminal treatment agent along with the aldehydedicarboxylate of the present invention will not spoil the effect thereof.

By the addition of amide type stabilizer such as nylon, or bisphenol type antioxidant, the better heat stability of macromolecular polyoxymethylene is obtained.

The same effect as against the homopolymer can be obtained against copolymer with oxymethylene group made as the base. The following are the examples to further illustrate the present invention:

Explanation about examples: As macro molecular polyoxymethylene, (1) Polymer (POM–1) obtained by introducing the gas of formaldehyde anhydrous into heptane at 0° C. along with 0.01% of tributylamine, and the polymerized matter is filtered, rinsed with acetone, and vacuum-dried.

(2) Polymer (POM–2, 3) obtained by electron beam-irradiation as much as 1 M rad onto crystalline trioxane, which is heat polymerized at 55° C., for 2 hours, rinsed with acetone removing unreacted trioxane completely and then vacuum-dried.

(3) Polymer (POM–4) obtained by adding 20% heptane to trioxane which is copolymered at 70° C. in the presence of 10% Dioxolane and 0.02% $BF_3$ etherate as catalyst, and then filtered, rinsed with acetone, and vacuum-dried.

(4) Polymer (POM–5) obtained by employing 5% dioxepane in place of dioxolane in the reaction 3.

(5) Polymer (POM–6) obtained by employing 15% styrene in place of dioxolane in the reaction (3), have been employed.

As regards the degrees of polymerization of these polymers, the degrees are given in $\eta$inh obtained by measuring the viscosity of 5% parachlorophenol solution containing 2% alpha pynene at 60° C. As regards the way of description of heat-stability, the percentage of the decreased amount of polymer as heated at 200° C. for 30 minutes in air, is represented by $D_{200}^{30}$, and the percentage of the decreased amount of polymer when 1% methylenebis-4-methyl-6-tertiary butylphenol as antioxidant and 3% copolymer of nylon 6 and nylon 610 as polyamide type heat stabilizer are added thereto, is represented by $D_{200}^{30NA}$.

*Example 1*

3 grams of pigmentary formaldehyde polymer (POM–1) is put into the 30 cc. of ethylideneacetate containing 5 cc. of pyridine, and then the mixture is heated at 150° C. for 30 minutes. After treatment it is cooled off, filtered, rinsed, and dried up, and white acetylated polymer at the yielding ratio of 84.5% was obtained.

The heat cracking ratio was $D_{200}^{30}=6.3\%$, $$D_{200}^{30NA}=3.1\%$$

and heat stability has been much improved.

While, untreated polyoxymethylene (POM–1) gives $D_{200}^{30}=9.2\%$, $D_{200}^{30NA}=19.6\%$, and the $\eta$inh of treated polymer is 2.18, and that of untreated polymer is 2.19.

*Example 2*

3 grams of ground trioxane polymer (POM–2) is put into 30 cc. of ethylidenediacetate in the presence of the below mentioned catalysts, and is heat-treated for an hour in 165° C. bath.

After treatment, it is cooled off, filtered, rinsed, and dried up, and then the ratio of heat-cracking is measured.

Table 1 shows the kinds and amount of catalysts employed, and the yielding ratios of polymers, the ratios of heat-cracking, and viscosities.

TABLE 1

| Catalysts | Yield, percent | Cracking ratio | | $\eta$inh |
|---|---|---|---|---|
| | | $D_{200}{}^{30}$ | $D_{200}{}^{30NA}$ | |
| Sodium Acetate, 0.1% | 82 | 15.4 | 7.9 | 1.92 |
| Calcium Acetate, 0.1% | 68 | 23.8 | 3.8 | 1.95 |
| Cetylpyridinum chloride, 0.1% | 68 | 22.1 | 9.9 | 1.88 |
| Pyridine, 5 cc | 90 | 20.9 | 5.3 | 1.85 |
| Untreated Polymer (POM-2) | | 57.0 | 41.4 | 1.76 |

As is observed in Table 1, the heat stability has been remarkably improved.

*Example 3*

3 grams of ground trioxane polymer (POM-2) is heat-treated at 170° C. along with 30 grams furfuraldiacetate, and 3 grams of pyridine for an hour, and then cooled off, filtered, rinsed, and dried, and then the cracking ratio thereof is measured.

The polymer obtained by this treatment gives the yielding ratio of 67%, and the ratio of heat-cracking is $D_{200}{}^{30}=7.8\%$, $D_{200}{}^{30NA}=6.7\%$, and therefore in comparison with $D_{200}{}^{30}=57.0\%$ of untreated polymer the heat-stability has been much improved. $\eta$inh is 1.6.

*Example 4*

3 grams of ground trioxane polymer (POM-3) is dissolved into 30 grams of benzylidenediacetate in the presence of the below mentioned catalysts, and is heat-treated at 180° C. for the below given periods of time.

After treatment, it is cooled off, filtered, rinsed, and dried up, and the heat-cracking ratio thereof is measured.

Table 2 shows the reaction time, kinds of catalysts, the quantities of catalysts applied, the yielding ratios of Polymer, the ratios of heat-cracking, and viscosities.

TABLE 2

| Catalysts | Reaction time | Yield, percent | Heat cracking ratio | | $\eta$inh |
|---|---|---|---|---|---|
| | | | $D_{200}{}^{30}$ | $D_{200}{}^{30NA}$ | |
| Sodium Acetate, 0.1% | 15 m | 65.0 | 11.9 | 5.0 | 1.97 |
| Do | 60 m | 56.2 | 11.0 | 3.7 | 0.88 |
| Pyridine, 5% | 15 m | 75.6 | 12.0 | 3.0 | 1.92 |
| Do | 60 m | 71.2 | 4.8 | 1.3 | 1.62 |
| β-Pyroline, 5% | 60 m | 70.7 | 6.4 | 0.45 | 0.45 |
| Untreated Polymer (POM-3) | | | 51.6 | 35.8 | 1.82 |

As is seen in Table 2, the stability of polymer has been improved by this treatment.

*Example 5*

3 grams of ground trioxane polymer (POM-2) is put into 15 cc. of ethylidenediacetate, and 15 cc. or γ-butyrolactone containing 2 cc. of pyridine, and the mixture is heat-treated at 160° C. for an hour.

After treatment, it is cooled off, filtered, rinsed, and dried up.

White polymer of good stability is obtained with the yield of 58%, and the ratio of heat-decomposition of $D_{200}{}^{30}=8.4\%$, $D_{200}{}^{30NA}=4.7\%$, $\eta$inh thereof is 1.76.

*Example 6*

Pulverized trioxane polymer (POM-3) is heat-treated at 165° C. for an hour along with 15 cc. of γ-butyrolactone containing 1.5 cc. of pyridine, and 15 cc. of benzylidenediacetate.

After treatment, it is cooled off, filtered, rinsed, and dried up.

Thus obtained polymer has the yield of 63.8%, $D_{200}{}^{30}=13.4\%$ $D_{200}{}^{30NA}=3.7\%$, $\eta$inh being 1.82.

*Example 7*

When acetophenone is employed as the solvent in place of γ-butyrolactone in the above case, the obtained polymer has the yield of 68%, the ratio of heat-decomposition of $D_{200}{}^{30}=10.5\%$, $D_{200}{}^{30NA}=6.0\%$, and $\eta$inh=1.82.

*Example 8*

Pulverized trioxane polymer (POM-3) is subjected to reaction in the presence of 0.1% sodium acetate against 30 grams of benzylidene diacetate and 1% NN'-dicyclohexylcarbodiimide at 180° C. for an hour.

The obtained polymer has the yield of 78.4%, $D_{200}{}^{30}=11.7\%$, $D_{200}{}^{30NA}=0.30\%$, and $\eta$inh=1.80.

*Example 9*

When 1% phenylisocyanate is employed in the reaction in place of carbodiimide in the above case, the obtained polymer has the yield of 79.6%, $D_{200}{}^{30}=8.5\%$, $D_{200}{}^{30NA}=0.7\%$, $\eta$inh being 1.58.

*Example 10*

3 grams of ground trioxane polymer (POM-4) is subjected to heat-treatment at 175° C. for an hour along with 30 g. of benzylidenediacetate, and 3 grams of pyridine as a catalyst, and after treatment, it is cooled off, filtered, rinsed, and dried up.

The polymer obtained has the yielding ratio of 85%, the heat-cracking ratio of $D_{200}{}^{30NA}=0.7\%$, $\eta$inh—1.32.

The polymer before the treatment had $D_{200}{}^{30NA}$ of 6%, $\eta$inh of 1.40.

*Example 11*

3 grams of ground trioxanecopolymer (POM-5) is heat-treated the same way as in Example 10.

The obtained polymer has the yielding ratio of 86%, heat-cracking ratio of $D_{200}{}^{30NA}$ being 0.9%, $\eta$inh being 1.43.

*Example 12*

5 grams of trioxane copolymer (POM-6) is subjected to reaction at 180° C. for one hour along with 40 grams of benzylidenediacetate and 5 grams of isokinoline.

After treatment, it is cooled off, filtered, rinsed, and dried up.

The obtained polymer has the yielding ratio of 77%, $D_{200}^{30NA}$ being 2.1%, $\eta$inh being 1.40.

The polymer before the treatment had $D_{200}^{30NA}$ being 10.1%, $\eta$inh being 1.41.

In this reaction, the degree of polymerization of the treated polymer, i.g. $\eta$inh being 1.38 has not changed almost, and as a matter of fact, in forming a fusing film by adding 2,2'-methylene-bis-4-methyl-6-butylphenol, nylon, the toughness thereof has not changed at all.

TABLE 3.—RESULT OF HEAT STABILITY BY ALDEHYDEDICARBOXYLATE

| Ex. | | Conc. (percent) | Solvent | Catalyst | Conc. (percent) | Temperature (°C.) | Time (h.) | Yield (percent) | $D_{200}^{30}$ (percent) | $D_{200}^{30NA}$ (percent) | $\eta$inh |
|---|---|---|---|---|---|---|---|---|---|---|---|
| 15 | Octadodecylidene-diacetate | 100 | | Pyridine | 10 | 165 | 1.5 | 87 | 15.2 | 3.0 | |
| 16 | β-Chloroethylidene-diacetate | 100 | | do | 15 | 165 | 1.5 | 83 | 17.3 | 3.2 | |
| 17 | β-Phenoxyethylidene-diacetate | 100 | | do | 10 | 165 | 1.5 | 86 | 19.8 | 2.6 | 1.36 |
| 18 | Benzylidenedibutyrate | 100 | | do | 10 | 180 | 1 | 70 | 10.3 | 1.6 | 1.31 |
| 19 | Benzylidenedistearate | 80 | BL | do | 10 | 180 | 1 | 68 | 13.8 | 1.9 | |
| 20 | Benzylidenediethylthiopropionate | 80 | A | β-Picoline | 5 | 180 | 1 | 67 | 10.7 | 1.7 | 1.35 |
| 21 | Benzylidenedibenzoate | 70 | A | do | 5 | 180 | 1 | 69 | 9.3 | 1.7 | 1.31 |
| 22 | Benzylidenedi-m-chlorobenzoate | 70 | A | do | 5 | 175 | 1 | 67 | 10.9 | 2.3 | |
| 23 | Benzylidenedifuroate | 70 | A | Pyridine | 10 | 175 | 1 | 66 | 12.1 | 2.1 | |
| 24 | P-methylbenzylidene-diacetate | 100 | | β-Picoline | 1 | 180 | 1 | 79 | 7.2 | 0.8 | 1.39 |
| 25 | m-Chlorobenzylidene-diacetate | 100 | | Pyridine | 5 | 180 | 1 | 77 | 9.3 | 0.9 | 1.32 |
| 26 | P-nitrobenzylidene-diacetate | 80 | BL | do | 5 | 180 | 1 | 73 | 10.4 | 1.1 | 1.36 |
| 27 | P-acetylaminobenzylidene diacetate | 80 | BL | β-Picoline | 1 | 180 | 1 | 71 | 9.8 | 1.2 | |
| 28 | Nitrofurfurylidene diacetate | 80 | A | do | 1 | 180 | 1 | 67 | 10.1 | 1.6 | |

NOTE.—The letters "BL" and "A" under the column headed "Solvent" represent butyrolactone and acetophenone, respectively.

Example 13

3 grams of ground trioxane copolymer (POM-2) is subjected to reaction at 180° C. for an hour along with 30 grams of benzylidenedibutylate, 0.2 gram of β-picoline as a catalyst, 0.02 gram of n-butylvinylether as an additive.

After treatment, it is cooled off, filtered, rinsed and dried up.

The obtained polymer had the yielding ratio of 74%, $D_{200}^{30}$ being 9.8, $D_{200}^{30NA}$ being 1.0%, and $\eta$inh being 1.89.

Example 14

2 grams of ground trioxanecopolymer (POM-5) is well mixed up with 0.02 gram of quinoline, and 0.2 gram of benzylidenedibenzoate, and put into a small test-tube, and is subjected to heat-treatment at 170° C. under reduced pressure of 5 to 10 mm. Hg for about 2 hours.

Thus obtained polymer had the yield of 80%, $D_{200}^{30}$ being 13.1%, $D_{200}^{30NA}$ being 1.2%, and $\eta$inh being 1.45.

Examples 15 to 28

3 grams of trioxane-catalyst-solid phase polymer (POM-7) [1] is subjected to heat-treatment at a given temperature for a given period of time along with a reagent of 500% by weight or the solution of a given solvent with a given concentration.

After reaction, it is put into acetone, and the obtained polymer is subjected to the treatment by Soxhlet apparatus, where it is continuously extracted with acetone or methanol, and the remaining reagent is completely removed, and then it is subjected to vacuum drying.

The results obtained are given on Table 3.

Compared with untreated polymer having the ratio of heat-decomposition $D_{200}^{30}$ being 25.1%, $D_{200}^{60NA}$ being 5.3%, the treated polymer has a remarkably improved heat-stability.

---

[1] The process of the production of this polymer is as follows: Polymer (POM-7) is obtained by mixing up crystal trioxane, and 0.03% triethyloxonium-borofluoride as catalyst dissolved in 1% methylene chloride, and the mixture is heat-polymerized at 55° C. for 2½ hours, and then it is filtered, rinsed with acetone, and vacuum-dried.

We claim:

1. A process for the heat stabilizing of polyoxymethylene which comprises substitutionally acylating polyoxymethylene with an aldehyde dicarboxylate of the formula:

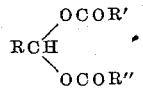

wherein R is selected from the group consisting of alkyl radicals having from 1 to about 20 carbon atoms, an aryl radical, an alicyclic radical, a furfuryl radical and substituted derivatives thereof; and R' and R" are selected from the group consisting of organic radicals derived from lower aliphatic monocarboxylic acids, fatty acids, aromatic carboxylic acids and furoic acid;

in the presence of a catalytic amount of an acylating catalyst selected from alkali and alkaline earth salts of saturated aliphatic monocarboxylic acids, aromatic amines, aliphatic amines, heterocyclic nitrogen-containing compounds and salts thereof, said aldehyde dicarboxylate being employed in an amount of from 2 to 10 times by weight of the polyoxymethylene.

2. The process of claim 1 wherein the acylation is conducted at a temperature between room temperature and 220° C.

3. The process of claim 2 wherein the acylation reaction is carried out between 130° C. and 190° C.

4. The process of claim 1 wherein an agent selected from the group consisting of carbodiimides, isocyanates, isothiocyanates, cyanamides, epoxy compounds, vinylesters, vinylethers and thiovinylethers, is employed to prevent decomposition.

References Cited by the Examiner

Kern et al.: Angewandte Chemie, 73 No. 6, pp. 77-186, March 21, 1961.

WILLIAM H. SHORT, *Primary Examiner.*

L. M. MILLER, *Assistant Examiner.*